United States Patent
Abele et al.

(10) Patent No.: US 9,061,646 B2
(45) Date of Patent: Jun. 23, 2015

(54) VEHICLE OCCUPANT SYSTEM HAVING AN ADAPTIVE KNEE AIRBAG

(75) Inventors: Timo Abele, Abtsgmuend (DE); Werner Freisler, Heubach (DE)

(73) Assignee: TRW AUTOMOTIVE GMBH, Alfdorf (DE)

(*) Notice: Subject to any disclaimer, the term of this patent is extended or adjusted under 35 U.S.C. 154(b) by 0 days.

(21) Appl. No.: 14/123,536

(22) PCT Filed: Jun. 5, 2012

(86) PCT No.: PCT/EP2012/002377
§ 371 (c)(1),
(2), (4) Date: Jan. 16, 2014

(87) PCT Pub. No.: WO2012/167908
PCT Pub. Date: Dec. 13, 2012

(65) Prior Publication Data
US 2014/0125039 A1      May 8, 2014

(30) Foreign Application Priority Data
Jun. 8, 2011  (DE) .......................... 10 2011 105 032

(51) Int. Cl.
*B60R 21/239*     (2006.01)
*B60R 21/206*     (2011.01)
(Continued)

(52) U.S. Cl.
CPC ....... *B60R 21/206* (2013.01); *B60R 2021/0051* (2013.01); *B60R 21/239* (2013.01); *B60R 2021/23169* (2013.01); *B60R 2021/2395* (2013.01)

(58) Field of Classification Search
CPC ................ B60R 21/206; B60R 21/239; B60R 2021/0051; B60R 2021/2395; B60R 2021/23169

USPC ........................................ 280/732, 739, 730.1
See application file for complete search history.

(56) References Cited

U.S. PATENT DOCUMENTS 6,971,670 B1 * 12/2005 Eriksson ........................ 280/739
7,988,188 B2 *  8/2011 Zauritz et al. .............. 280/730.2
(Continued)

FOREIGN PATENT DOCUMENTS

DE        10146493 A1 *  4/2003
DE     102004009013       9/2005
(Continued)

*Primary Examiner* — Ruth Ilan
(74) *Attorney, Agent, or Firm* — Tarolli, Sundheim, Covell & Tummino LLP

(57) ABSTRACT

A vehicle occupant restraint system comprises an inflatable knee airbag (10). The knee airbag (10) includes an airbag sheath (12) and at least one vent hole (18) formed therein. The vent hole (18) is arranged in the upper half of the knee airbag (10) and is provided on a side of the knee airbag (10) facing away from the vehicle occupant which in the operating position of the knee airbag (10) is directly opposed to a fixed component (28) in the vehicle interior. A method of protecting a vehicle occupant comprises the following steps of: Inflating a knee airbag (10) with gas so that the knee airbag (10) adopts an operating position; and adapting the gas discharge behavior in accordance with the constitution, especially the body height of the vehicle occupant, in that a vent hole (18) formed in an upper section (36) of the knee airbag (10) is pressed against a fixed component (28) in the vehicle interior by the knee (38) of a normal size vehicle occupant moving forward and is closed thereby, or is not pressed against a fixed component (28) in the vehicle interior by the knee (38) of a small size vehicle occupant moving forward.

17 Claims, 3 Drawing Sheets

(51) Int. Cl.
  *B60R 21/00*     (2006.01)
  *B60R 21/231*    (2011.01)

(56) References Cited

U.S. PATENT DOCUMENTS

| | | | |
|---|---|---|---|
| 8,215,668 B2 * | 7/2012 | Cho et al. | 280/736 |
| 8,469,394 B2 * | 6/2013 | Schuller | 280/730.2 |
| 8,590,928 B2 * | 11/2013 | Spahn et al. | 280/739 |
| 2005/0184493 A1 | 8/2005 | Hofmann et al. | |
| 2007/0057492 A1 * | 3/2007 | Feller et al. | 280/730.2 |
| 2007/0187932 A1 * | 8/2007 | Sekizuka | 280/730.1 |
| 2007/0273133 A1 * | 11/2007 | Zauritz et al. | 280/742 |
| 2008/0023945 A1 * | 1/2008 | Zauritz et al. | 280/729 |
| 2009/0014989 A1 * | 1/2009 | Henderson et al. | 280/730.2 |
| 2011/0062692 A1 * | 3/2011 | Yamane | 280/739 |

FOREIGN PATENT DOCUMENTS

| | | |
|---|---|---|
| EP | 1279565 | 1/2003 |
| JP | 2006076418 | 3/2006 |
| JP | 2011-51424 A * | 3/2011 |
| WO | WO 2006/072395 A1 * | 7/2006 |

* cited by examiner

VEHICLE OCCUPANT SYSTEM HAVING AN ADAPTIVE KNEE AIRBAG

RELATED APPLICATIONS

This application corresponds to PCT/EP2012/002377, filed Jun. 5, 2012, which claims the benefit of German Application No. 10 2011 105 032.2, filed Jun. 8, 2011, the subject matter, of which are incorporated herein by reference in their entirety.

BACKGROUND OF THE INVENTION

The invention relates to a vehicle occupant restraint system comprising an inflatable knee airbag. The invention further relates to an automotive vehicle comprising such vehicle occupant restraint system. Finally the invention also relates to a method of protecting a vehicle occupant.

The inflation and discharge behavior of airbags is tested by crash test dummies in impact tests. Crash test dummies are life-size dummies simulating the human body. In order to duly take the different anatomic factors of real persons into account during simulations, the tests are usually carried out with three different dummies. The "50 percent male" having a body height of 175 cm and a weight of 78 kg is supposed to generally correspond to a vehicle occupant of "normal" size, the "95 percent male" having a body height of 188 cm and a weight of 101 kg is supposed to correspond to a tall vehicle occupant and the "5 percent female" having a body height of 152 cm and a weight of 54 kg is supposed to correspond to a small vehicle occupant.

From DE 10 2004 009 013 A1 a side impact restraint device for protecting an occupant being seated on a vehicle seat in a vehicle comprising an airbag is known which adapts to the build of the vehicle occupant. The airbag deploys between a side structure of the vehicle and the vehicle occupant and includes a first vent hole arranged in a zone of the airbag facing the vehicle occupant. The vertical position of the vent hole is selected so that it is not covered by the upper part of the body of a small size vehicle occupant but is definitely covered by a large size vehicle occupant. Thus for a small size vehicle occupant a lower internal pressure is resulting than for a large size vehicle occupant.

In EP 1 279 565 A1 a generic occupant protection device comprising a knee airbag is shown in which a vent hole is provided in an upper end portion. The vent hole interacts with a passenger airbag disposed above the knee airbag. When the legs of the vehicle occupant strike the deployed knee airbag and the vent hole initially is not yet covered by the passenger airbag, gas may flow out of the vent hole. In this way the impact exerted on the vehicle occupant is damped. However, as soon as the deployed passenger airbag covers the vent hole, the gas discharge from the vent hole is restricted so that a minimum internal pressure of the knee airbag is maintained for a quite long period of time.

SUMMARY OF THE INVENTION

It is the object of the invention to enable the protective effect of an inflated knee airbag to be adapted to the build of a vehicle occupant.

Said object is achieved by a vehicle occupant restraint system comprising the features of claim 1. Advantageous and expedient configurations of the vehicle occupant restraint system according to the invention are described in the corresponding subclaims.

The vehicle occupant restraint system according to the invention comprises an inflatable knee airbag having an airbag sheath and at least one vent hole formed therein. The vent hole is arranged in the upper half of the knee airbag. In accordance with the invention, the vent hole is provided on a side of the knee airbag facing away from the vehicle occupant which, in the operating position of the knee airbag, is directly opposed to a fixed component in the vehicle interior.

The invention is based on the finding that an improved protective effect can be obtained by adaptation of the internal pressure of the knee airbag to the physical constitution of the respective vehicle occupant. Compared to expensive "active" solutions that require e.g. an electronic occupant qualification and a multi-stage inflator, the "passive" solution according to the invention can be realized at definitely lower cost.

The substantial requirement for adapting the internal pressure within the knee airbag to the build of the respective vehicle occupant is the particular arrangement of the vent hole on the side facing away from the vehicle occupant directly opposed to a fixed component in the vehicle interior, especially the lower part of the instrument panel of the vehicle. It is possible in this way to automatically control closing and releasing the vent hole by interaction of the vehicle occupant with the knee airbag: The vent hole is closed when the respective section of the airbag in which the vent hole is formed is pressed against the component by the knees of the vehicle occupant moving forward. On the other hand, the vent hole remains open when the section including the vent hole is not pressed against the component.

In this way, irrespective of the constitution of the vehicle occupant, always the same amount of gas can be used for inflating the knee airbag, because the internal pressure can adapt automatically. Occupant qualification or a multi-stage inflator is not necessary for the solution according to the invention.

In particular, the knee airbag is arranged at its operating position (i.e. in the completely inflated condition) so that the vertical section of the airbag in which the vent hole is formed is opposed to the knee of a normal size vehicle occupant. This ensures that in the case of a normal size vehicle occupant the vent hole is pressed against the component in the vehicle interior and is thus closed so that the maximum internal pressure is permanently available for restraining the vehicle occupant.

Accordingly, the knee airbag should be arranged at its operating position also in such manner that the vertical section of the airbag in which the vent hole is formed is not opposed to the knee of a small size vehicle occupant. This ensures that in the case of a small size vehicle occupant the knees of the latter do not close the vent hole and gas can flow out of the knee airbag. The internal pressure is reduced and a better damped restraint behavior is permitted.

In this context, the invention is based on the fact that the various vehicle occupants (large size, normal size, small size) can be differentiated with sufficient reliability by way of the vertical knee position. The knee position relates to the seating position of appropriate dummies common in crash tests.

Due to the anatomic differences and the contingent variation of the knee height of the vehicle occupants, it is most favorable when in a knee airbag which in its operating position, especially by tethers inside the knee airbag, is subdivided into plural vertical sections the vent hole is formed in an upper, preferably the uppermost section.

In the case of a knee airbag of a vehicle occupant restraint system according to the invention designed for large size, normal size and small size vehicle occupants a vent hole having a diameter between 20 mm and 40 mm turns out to be ideal.

In accordance with a more expensive approach of the invention, in a special embodiment plural vertically superimposed vent holes are provided. Such arrangement allows for adapting the internal pressure of the airbag more accurately to the actual constitution of the vehicle occupant. In this way, a normal size occupant will press more vent holes against the opposite fixed component and thus close them than a somewhat smaller size occupant. Depending on the number and the distance of the vent holes, different variations are possible.

In order to fulfill the basic functionality of the knee airbag according to the invention it is provided in the afore-mentioned embodiment that at least a large part of the vent holes is arranged between the knee impact positions of a normal size vehicle occupant but above the knee impact positions of a small size vehicle occupant.

Preferably the superimposed vent holes have a larger horizontal width compared to their vertical height. By way of such gill-type structure a plurality of vent holes can be realized within small space (in the vertical direction) so that a finer adjustment of the internal pressure of the airbag can be obtained.

In the embodiment including the superimposed vent holes preferred adjustments of the internal pressure of the airbag depending on the build of the vehicle occupant are resulting from a vertically centered arrangement of the vent holes and/or from the fact that the width of the vent holes decreases with increasing height.

In order to direct the gas flowing out of the knee airbag away from the vehicle occupant a vent passage starting from the vent hole can be provided on the outside of the knee airbag. The vent passage ensures that the possibly hot gas provided in the knee airbag and containing particles does not impinge on the vehicle occupant.

According to the preferred embodiment of the vent passage, the latter is formed by a cover that is mounted on the airbag sheath in a way not completely circumferentially around the vent hole and can bulge under the pressure of the outflowing gas. On the one hand, this allows for a space-saving design as the cover needs hardly any additional space in the folded airbag package. On the other hand, the bulging ensures that the vent passage can reach and maintain a predetermined size, even if the inflated airbag (without the pressure exerted by a vehicle occupant moving forward) is in close contact with the instrument panel.

In accordance with a preferred configuration of the vent passage, the length thereof is at least 1.5 times the diameter of the vent hole, measured from the center thereof.

In order to protect the vehicle occupant against the gas escaping from the knee airbag the vent passage should not be directed toward the occupant, but it should extend e.g. to one side, preferably in the direction of a vehicle side structure.

Alternatively, the vent passage can also extend substantially upwards or downwards.

In the latter case (vent passage extending upwards) an embodiment in which the cover has a central downwardly facing extension not mounted on the airbag sheath is of special advantage. A vehicle occupant whose body height and weight range between that of a normal size vehicle occupant and a small size vehicle occupant presses only said extension against the fixed component. Thus the cross-section of the vent passage is reduced, but not to zero. Especially in this case a two-part vent passage is formed by the central arrangement of the extension, with each of the partial passages facing obliquely downwards.

Being tailored to this course of the partial passages, the vent hole preferably includes one or more bulges extending equally obliquely downwards.

The object of the invention is also achieved by a method of protecting a vehicle occupant comprising the steps of:

Inflating a knee airbag with gas so that the knee airbag adopts an operating position;

Adapting the gas discharge behavior in accordance with the constitution, especially the body height of the vehicle occupant, in that a vent hole formed in an upper section of the knee airbag a) is pressed against a fixed component in the vehicle interior by the knee of a normal size vehicle occupant moving forward and is closed thereby, or b) is not pressed against a fixed component in the vehicle interior by the knee of a small size vehicle occupant moving forward.

In this case, too, a seating position usually adopted by appropriate crash test dummies in impact tests is assumed.

BRIEF DESCRIPTION OF THE DRAWINGS

Further features and advantages of the invention are evident from the following description and from the enclosed drawings which are referred to and in which.

DESCRIPTION OF EMBODIMENTS

Figure 1:
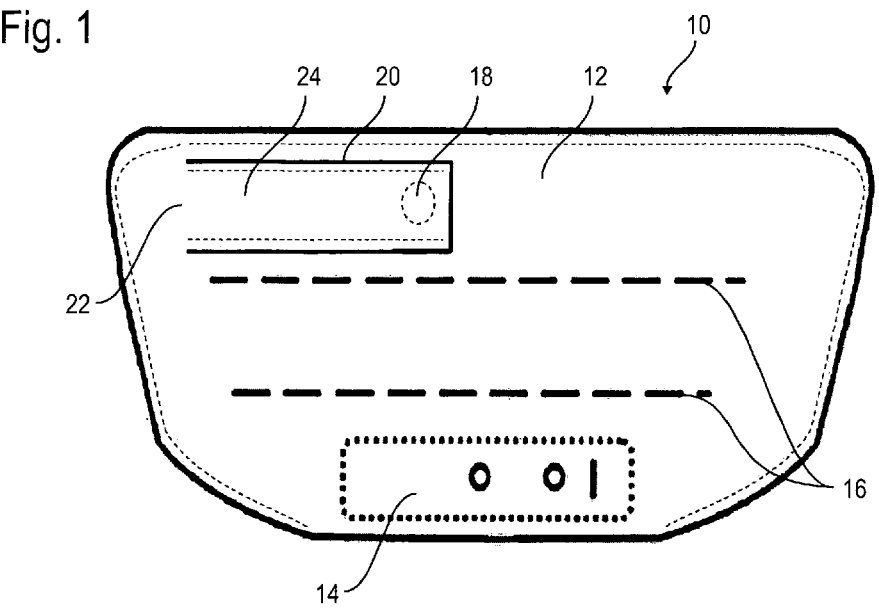
FIG. 1 shows a top view onto a spread knee airbag for a vehicle occupant restraint system according to the invention in accordance with a first embodiment.

FIG. 1 illustrates a knee airbag 10 for a vehicle occupant restraint system according to a first embodiment comprising an airbag sheath 12 having a connecting zone 14 for an inflator and connecting points 16 for one or more tethers. Furthermore the airbag sheath 12 includes a vent hole 18 which is substantially circular and preferably has a diameter between 20 mm and 40 mm.

Figure 2:
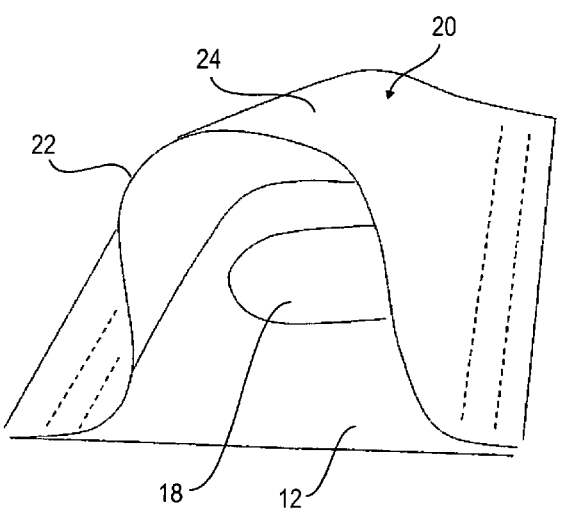
FIG. 2 shows a perspective view of a cut-out of the knee airbag from FIG. 1 in the inflated condition.

The vent hole 8 is covered by a cover 20 in the form of a flexible fabric layer or another not dimensionally stable material which, with the exception of a venting section 22 around the vent hole 18, is fastened to the airbag sheath 12. The cover 20 is fastened so that a passage portion 24 of the cover 20 located above the vent hole 18 can bulge. Thus said passage portion 24 together with the part of the airbag sheath 12 located there below can define a vent passage for the gas provided inside the knee airbag 10 in the inflated condition of the knee airbag 10, as shown in FIG. 2. For this purpose, the cover 20 can also be made of expandable material. The length of the vent passage is at least 1.5 times the diameter of the vent hole 18, measured from the center thereof.

Figure 3:
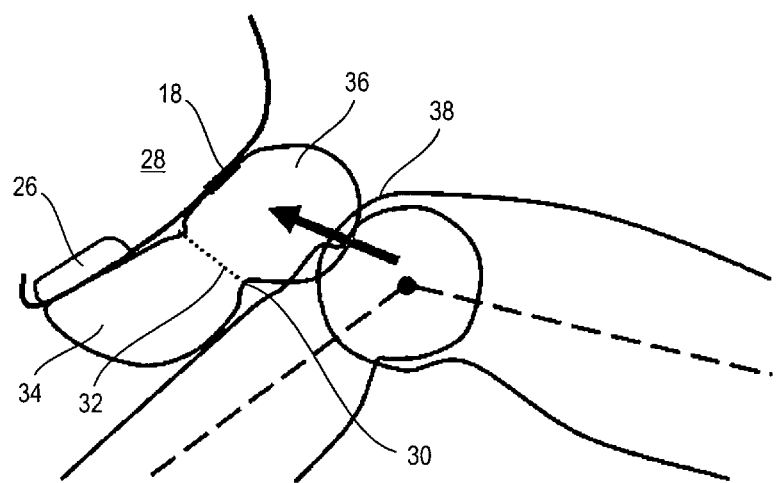
FIG. 3 shows interaction of a normal size vehicle occupant with the inflated knee airbag from FIG. 1 in a vehicle.
Figure 4:
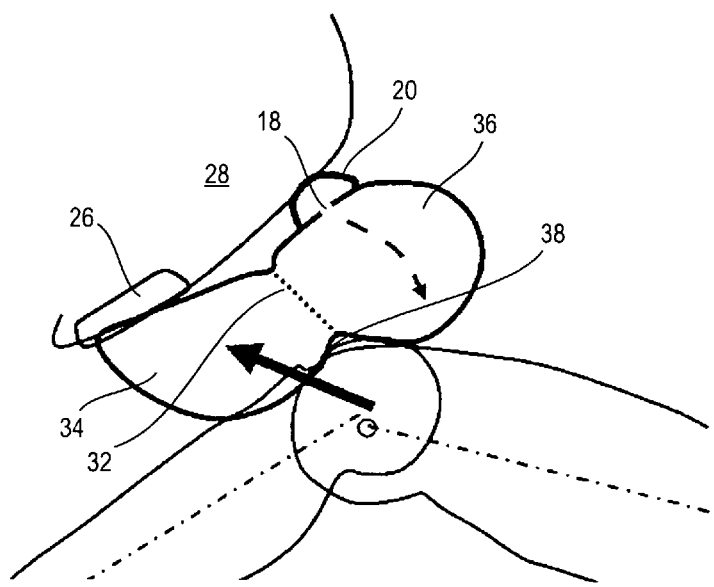
FIG. 4 shows interaction of a small size vehicle occupant with the inflated knee airbag from FIG. 1 in a vehicle.

It is evident from FIGS. 3 and 4 that the knee airbag 10 is mounted in a receptacle 26 behind the lower part of the instrument panel 28 of the vehicle so that in the case of restraint upon inflation by the inflator it deploys out of an aperture in the instrument panel 28. In the shown operating position the knee airbag 10 adopts an orientation substantially corresponding to the orientation of the spread but not inflated knee airbag 10 illustrated in FIG. 1.

This means that in the inflated condition of the knee airbag 10 the vent passage extends horizontally in the direction of a vehicle side structure starting from the vent hole 18. Also in the mounted, not deployed condition of the knee airbag 10 the vent passage extends in this direction. However, in other embodiments also extensions deviating by up to 30° or even up to 45° from the horizontal are possible.

Furthermore, it is evident from FIGS. 3 and 4 that the vent hole 18 is formed in the upper half of the knee airbag 10. In the shown embodiment the knee airbag 10 is subdivided by a constriction 30 caused by the arrangement and the length of one or more inner tethers 32 into a lower section 34 which is closer to the receptacle 26 and an upper section 36 in which the vent hole 18 is provided. When the knee airbag 10 includes plural vertical sections, the vent hole 18 is preferably formed in the uppermost of said sections. In any case the vent hole 18 is formed on the side of the knee airbag 10 facing away from the vehicle occupant and thus is immediately opposed to the instrument panel 28.

The arrangement of the knee airbag 10 including the vent hole 18 is selected such that a normal size vehicle occupant, who can be simulated by a "50 percent male" in crash tests, upon moving forward impacts with his/her knee 38 on the inflated knee airbag 10 so that the upper section 34 of the knee airbag 10, and especially the vent hole 18 formed in the same, is pressed against the instrument panel 28. In this closed condition of the vent hole 18 represented in FIG. 3 no gas or only very little gas can escape from the knee airbag 10 through the vent hole 18 so that the knee airbag 10 is adapted to maintain a high internal pressure and thus exert a protective function sufficient for the normal size vehicle occupant.

Intentional suppression of the gas discharge is permitted by the fact that the upper airbag section 36 including the vent hole 18 is opposed to the knee 38 of the normal size vehicle occupant. The knee airbag 10 shows a similar behavior in the case of a large size vehicle occupant.

On the other hand, the knee airbag 10 behaves differently in the case of a small size vehicle occupant who can be simulated by a "5 percent female". As is evident from FIG. 4, the small size vehicle occupant impacts with his/her knee 38 most largely on the lower section 34 of the knee airbag 10. The knee airbag 10 is designed so that in this case the vent hole 18 is spaced from the instrument panel 28 so that gas can escape from the knee airbag 10 through the vent hole 18. This behavior of the knee airbag 10 is assisted by the fact that the cover 20 bulging by the gas exiting through the vent hole 18 can be supported on the instrument panel 28 and thus keeps the vent hole 18 at a distance from the instrument panel 28.

In this way the impact of the knees 38 of the small size vehicle occupant on the fully inflated knee airbag 10 is damped. However, the amount of gas flowing into the knee airbag 10 as well as the vent hole 18 and the vent passage are dimensioned such that an internal pressure of the airbag sufficient for a small size vehicle occupant is ensured. The vent passage directs the outflowing gas to the side into an area that is uncritical to the vehicle occupant.

The design and the arrangement of the knee airbag 10 are geared to the knee positions of the respective crash test dummies (50 percent male, 95 percent male and 5 percent female) as they are predetermined by the common seating position of the dummies during impact tests (no OOP positions as they are called).

Also embodiments are possible in which the vent hole 18 is not opposed to the instrument panel 28 but to another fixed component in the vehicle interior. What is important is that the vent hole 18 can be pressed against said component by a normal size vehicle occupant moving forward so that thereby the outflow of gas is hindered.

As a matter of course, also a plurality of said vent holes 18 and pertinent vent passages can be provided.

Figure 5:
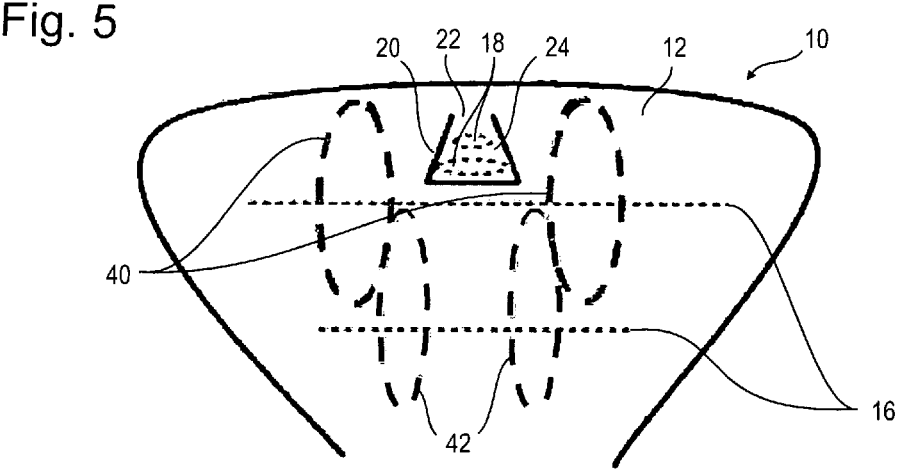
FIG. 5 is a top view onto a spread knee airbag for a vehicle occupant restraint system according to the invention in accordance with a second embodiment.

FIG. 5 illustrates a knee airbag 10 for a vehicle occupant restraint system according to a second embodiment. As in FIG. 1, also in this case the airbag 10 is shown from the opposite view of the vehicle occupant. In contrast to the first embodiment, here plural vent holes 18 are provided. The vent holes 18 are provided, as in the first embodiment, on the side of the knee airbag 10 facing away from the vehicle occupant, i.e. they are directly opposed to the instrument panel 28 or any other fixed component. All of the vent holes 18 are also arranged in the upper half, more exactly speaking in the upper third, of the knee airbag 10.

The vent holes 18 are superimposed at small distances and, compared to their vertical height, have a definitely larger horizontal width. Especially the vent holes 18 can have an oval or slit-like shape. The vent holes 18 are arranged to be vertically centered with the width of the vent holes 18 decreasing with increasing height.

The vent holes 18 are covered by a cover 20 made of a flexible fabric layer or any other not dimensionally stable material. As in the first embodiment, the cover 20 is fastened, with the exception of a venting section 22 around the vent holes 18, to the airbag sheath 12 so that a passage section 24 of the cover 20 located above the vent holes 18 can bulge and thus define a vent passage. However, the cover 20 is arranged such that the venting section 22 faces upwards, i.e. the vent passage extends vertically upwards.

In FIG. 5 also the knee impact points 40 for a normal size vehicle occupant and the lower knee impact points 42 for a small size vehicle occupant are indicated. In the case of a normal size vehicle occupant, practically all or at least a larger part of the vent holes 18 are located between the knee impact points 40 (on the opposite side of the knee airbag 10), wherein in the case of a small size vehicle occupant practically all or at least a larger part of the vent holes 18 are located above the knee impact points 42.

If, upon moving forward, a normal size vehicle occupant impacts with his/her knees 38 on the inflated knee airbag 10 and presses the upper section 34 of the knee airbag 10 including the vent holes 18 against the instrument panel 28 (cf. FIG. 3), all or at least a larger part of the vent holes 18 are closed thereby. In the case of a small size vehicle occupant, on the other hand, all or at least a larger part of the vent holes 18 are available, as the vent holes 18 are spaced apart from the instrument panel 28 (cf. FIG. 4). In this case, part of the gas can flow out upwards through the vent passage.

For vehicle occupants whose body height and/or weight ranges from that of a 5 percent dummy to that of a 50 percent dummy more or fewer vent holes 18 are accordingly released or blocked. Thus the internal pressure of the knee airbag 10 individually adapts to the constitution of each vehicle occupant.

Figure 6:
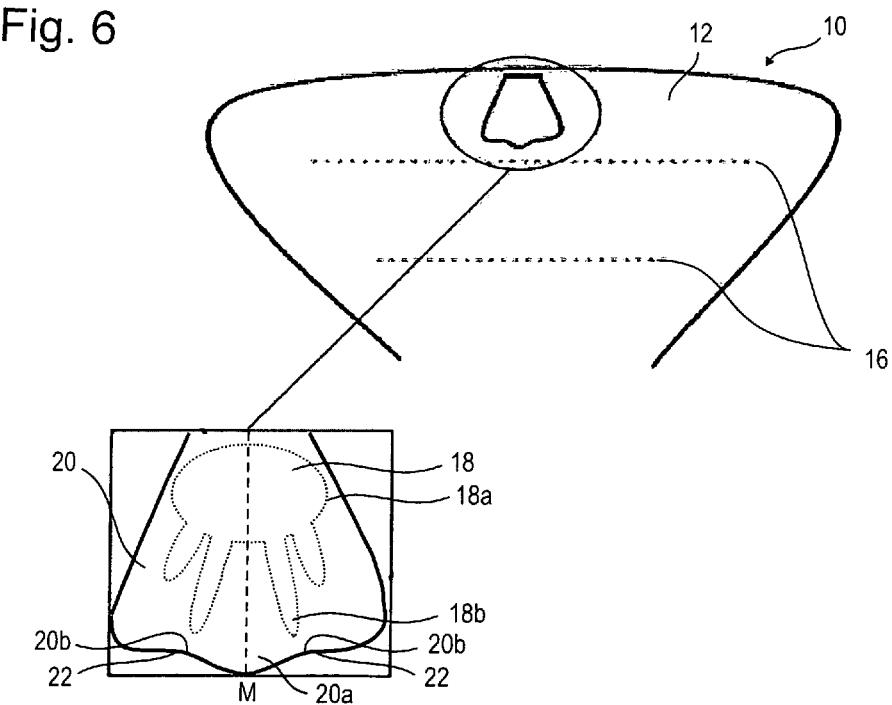
FIG. 6 is a top view of a spread knee airbag for a vehicle occupant restraint system according to the invention in accordance with a third embodiment.

FIG. 6 illustrates a knee airbag 10 for a vehicle occupant restraint system according to a third embodiment. In this case a single vent hole 18 arranged in the same zone of the knee airbag 10 as the vent holes 18 of the second embodiment is provided. The vent hole 18 is also covered by a cover 20.

As can be inferred from the enlarged detail in FIG. 6, the vent hole 18 has a special shape here. On the basis of an oval basic shape 18*a*, plural bulges 18*b* extend on both sides of a centerline M obliquely downwards, viz. away from the centerline M.

The cover 20 in turn delimits a vent passage which in this case faces downwards, i.e. in the direction of the floor space of the vehicle. Moreover the cover 20 is shaped so that in the center (related to the centerline M) it has an extension 20*a* and optionally on both sides of the centerline M it has indentations 20*b*.

As in the foregoing embodiments, a normal size vehicle occupant will press the knee airbag 10 with his/her knees 38 against the instrument panel such that the vent hole 18 is closed by the cover 20. In the case of a small size occupant, on the other hand, whose knees 38 most largely do not impact on the lower section 34 of the knee airbag 10 the vent hole 18 is not pressed to be closed.

Even in the case of a somewhat taller vehicle occupant (body height/weight between the 5 percent dummy and the 50 percent dummy), gas can escape from the knee airbag 10, as in this case only the extension 20*a* of the cover 20 is pressed against the airbag sheath 12. The vent passage is thus subdivided into two smaller partial passages on both sides of the centerline M. The bulges 18*b* of the vent hole 18 are appropriately tailored to the cover 20 including the extension 20*a* thereof and possibly the indentations 20*b* thereof.

If gas escapes through the vent hole 18, the gas flows out substantially to the bottom, wherein the main venting direction(s) is/are predetermined by the occupant-dependent shape of the vent passage (a large downwardly directed passage or two smaller oblique partial passages).

As a matter of course, the afore-described embodiments or particular features of the individual embodiments may be appropriately combined with each other.

LIST OF REFERENCE NUMERALS

10 knee airbag
12 airbag sheath
14 connecting zone
16 connecting points
18 vent hole
18*a* basic shape
18*b* bulges
20 cover
20*a* extension
20*b* indentations
22 venting section
24 passage section
26 receptacle
28 instrument panel
30 constriction
32 tether
34 lower airbag section
36 upper airbag section
38 knee
40 knee impact points (normal size vehicle occupant)
42 knee impact points (small size vehicle occupant)

The invention claimed is:

1. A vehicle occupant restraint system comprising an inflatable knee airbag (10), wherein the knee airbag (10) includes an airbag sheath (12) and at least one vent hole (18) formed in the same which is arranged in the upper half of the knee airbag (10), wherein the vent hole (18) is provided on a side of the knee airbag (10) facing away from the vehicle occupant which in the operating position of the knee airbag (10) is directly opposed to a fixed component (28) in the vehicle interior.

2. The vehicle occupant restraint system according to claim 1, wherein the knee airbag (10) is arranged in its operating position so that the vertical section (36) of the knee airbag (10) in which the vent hole (18) is formed is adapted to be opposed to the knee (38) of a normal size vehicle occupant.

3. The vehicle occupant restraint system according to claim 1, wherein the knee airbag (10) is arranged in its operating position so that the vertical section (36) of the knee airbag (10) in which the vent hole (18) is formed is adapted to not be opposed to the knee (38) of a small size vehicle occupant.

4. The vehicle occupant restraint system according claim 1, wherein in its operating position, the knee airbag (10) is subdivided into plural vertical sections (34, 36) by tethers (32) inside the knee airbag, and the vent hole (18) is formed in the uppermost section (36).

5. The vehicle occupant restraint system according to claim 1, wherein the vent hole (18) has a diameter between 20 mm to 40 mm.

6. The vehicle occupant restraint system according to claim 1, wherein plural vertically superimposed vent holes (18) having a larger horizontal width compared to their vertical height are provided.

7. The vehicle occupant restraint system according to claim 6, wherein at least a larger part of the vent holes (18) is arranged between the knee impact points (40) of a normal size vehicle occupant but above the knee impact points (42) of a small size vehicle occupant.

8. The vehicle occupant restraint system according to claim 6, wherein the vent holes (18) are at least one of arranged to be vertically centered and arranged so that the width of the vent holes (18) decreases with increasing height.

9. The vehicle occupant restraint system according to claim 1, wherein on the outside of the knee airbag (10) a vent passage starting from the vent hole (18) for gas present in the knee airbag (10) is provided.

10. The vehicle occupant restraint system according to claim 9, wherein the vent passage is formed by a cover (20) which is fastened to the airbag sheath (12) in a way not completely circumferential around the vent hole (18) and can bulge under the pressure of the outflowing gas.

11. The vehicle occupant restraint system according to claim 9, wherein the length of the vent passage is at least 1.5 times the diameter of the vent hole (18) measured from the center thereof.

12. The vehicle occupant restraint system according to claim 9, wherein the vent passage extends to one side in the direction of a vehicle side structure.

13. The vehicle occupant restraint system according to claim 9, wherein the vent passage extends substantially upwards.

14. The vehicle occupant restraint system according to claim 9, wherein the vent passage extends substantially downwards.

15. The vehicle occupant restraint system according to claim 10, wherein the cover (20) has a central downwardly facing extension (20*a*) which is not fastened to the airbag sheath (12).

16. The vehicle occupant restraint system according to claim 15, wherein the vent hole (18) includes one or more bulges (18*b*) extending obliquely downwards.

17. A method of protecting a vehicle occupant comprising the following steps of:
Inflating a knee airbag (10) with gas so that the knee airbag (10) adopts an operating position;

Adapting the gas discharge behavior in accordance with the body height of the vehicle occupant, in that a vent hole (18) formed in an upper section (36) of the knee airbag (10)

a) is adapted to be pressed against a fixed component (28) in the vehicle interior by the knee (38) of a normal size vehicle occupant moving forward and is closed thereby, or b) is adapted to not be pressed against a fixed component (28) in the vehicle interior by the knee (38) of a small size vehicle occupant moving forward.

* * * * *